US010912406B2

(12) United States Patent
Burridge et al.

(10) Patent No.: US 10,912,406 B2
(45) Date of Patent: Feb. 9, 2021

(54) NO-BOIL OVER COOKING VESSEL LID (71) Applicant: Sunbeam Products, Inc., Boca Raton, FL (US)

(72) Inventors: Nikolos Brandon Burridge, Boca Raton, FL (US); Ramesh Nimmagadda, Boca Raton, FL (US); Eliott Guy Copier, Grand Rapids, MI (US)

(73) Assignee: Sunbeam Products, Inc., Boca Raton, FL (US)

( * ) Notice: Subject to any disclaimer, the term of this patent is extended or adjusted under 35 U.S.C. 154(b) by 33 days.

(21) Appl. No.: 16/360,587

(22) Filed: Mar. 21, 2019

(65) Prior Publication Data
US 2019/0290047 A1 Sep. 26, 2019

Related U.S. Application Data (60) Provisional application No. 62/647,140, filed on Mar. 23, 2018.

(51) Int. Cl.
*A47J 27/58* (2006.01)
*A47J 36/06* (2006.01)

(52) U.S. Cl.
CPC .............. *A47J 27/58* (2013.01); *A47J 36/06* (2013.01)

(58) Field of Classification Search
CPC .. A47J 27/58; A47J 27/56; A47J 36/08; A47J 36/06; A47J 36/16; A47J 36/20; A47J 37/101; B65D 51/16; B65D 25/2802; B65D 25/28

USPC ...... 220/370, 369, 367.1, 528, 573.4, 573.5, 220/573.1, 912, 771, 769, 768, 628, 631, 220/647, 646, 608, 623
See application file for complete search history.

(56) References Cited

U.S. PATENT DOCUMENTS

| D327,608 S | * | 7/1992 | Daenen | ........................ D7/667 |
| D558,538 S | * | 1/2008 | Curtin | ............................ D7/667 |
| D660,661 S | * | 5/2012 | Lee | ................................. D7/667 |

(Continued)

FOREIGN PATENT DOCUMENTS

| FR | 2719882 A1 | * | 11/1995 | ............. A47J 27/05 |
| GB | 306627 A | * | 2/1929 | ............. A47J 27/04 |

OTHER PUBLICATIONS

Translation of FR 2719882 A1, Arezki, Nov. 17, 1995. pp. 2-3 (Year: 1995).*

*Primary Examiner* — Robert J Hicks
(74) *Attorney, Agent, or Firm* — Husch Blackwell LLP (57) ABSTRACT

A vessel insert used to substantially prevent liquid boil over. The vessel insert can includes an upper wall extending downward to a transition wall. The transition wall extends towards a center of the vessel insert and extends outwardly at a skirt of the vessel insert. When the vessel insert is positioned in a cooking vessel, the transition wall engages an upper rim of the cooking vessel. A basket is positioned inside the vessel insert, extending downward along the transition wall. The basket includes a center hole and plurality of small holes. The basket has a bottom surface, which curves upwards to form a lower surface and the center hole. The plurality of small holes is positioned in the bottom surface the basket. The structure of the vessel insert is such that resulting boil over, foam, and liquids are directed back into the cooking vessel though the small holes.

20 Claims, 8 Drawing Sheets

(56) References Cited

U.S. PATENT DOCUMENTS 10,030,373 B1 * 7/2018 Batista .................... E03C 1/262
2005/0279698 A1 * 12/2005 Kleinman ............... A47J 36/18
 210/470

* cited by examiner

NO-BOIL OVER COOKING VESSEL LID

FIELD OF THE INVENTION

This invention relates generally to a cooking vessels, such and in particular, to a lid for cooking vessels, pots and pans, that substantially prevents liquid boil over.

BACKGROUND OF THE INVENTION

When using cooking vessels, such as post and pans, to heat liquids on stove tops, there can be a tendency for the liquids to boil over the edges of the cooking vessels. This can result in a loss of liquids in the cooking vessels, as well as, an accumulation of the liquid on the stove top. The resulting accumulation of liquid on the stove top can be subsequently dried by the heat of the stove top, resulting in a harden film which can be difficult to clean therefrom.

SUMMARY OF THE INVENTION

The present disclosure is directed to a cooking vessel insert, no boil over lid, which can be used to substantially prevent liquid boil over. The vessel insert can include a body portion having an upper body portion with an upper edge, defining an upper open end. The upper body portion can include upper wall extending downward, in a substantially vertical manner, to a transition wall. The transition wall is at a transitional angle A, inwardly, towards a center of the vessel insert 5, and extends to a skirt, of the vessel insert. The transitional angle A of the transition wall is such that when the vessel insert is positioned in a cooking vessel, the transition wall engages an upper rim of the cooking vessel to support the vessel insert therein. The skirt includes a lower edge, defining an open bottom end of the vessel insert. The skirt is profiled to support the vessel insert in the cooking vessel, and can include a seal at the lower edge of the skirt. A basket is positioned inside the vessel insert, extending downward along an inner surface of the transition wall. The basket includes a center hole and plurality of smaller hole. The basket can have a curved bottom surface, which curves up from a lower surface to from the edge of the center hole. The plurality of smaller holes are positioned in the bottom surface the basket, about the center hole. The profile of the curved bottom surface is such that resulting boil over, foam, and liquids are directed back into the cooking vessel though the smaller holes.

DESCRIPTION OF THE SEVERAL VIEWS OF THE DRAWING

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

Figure 1:
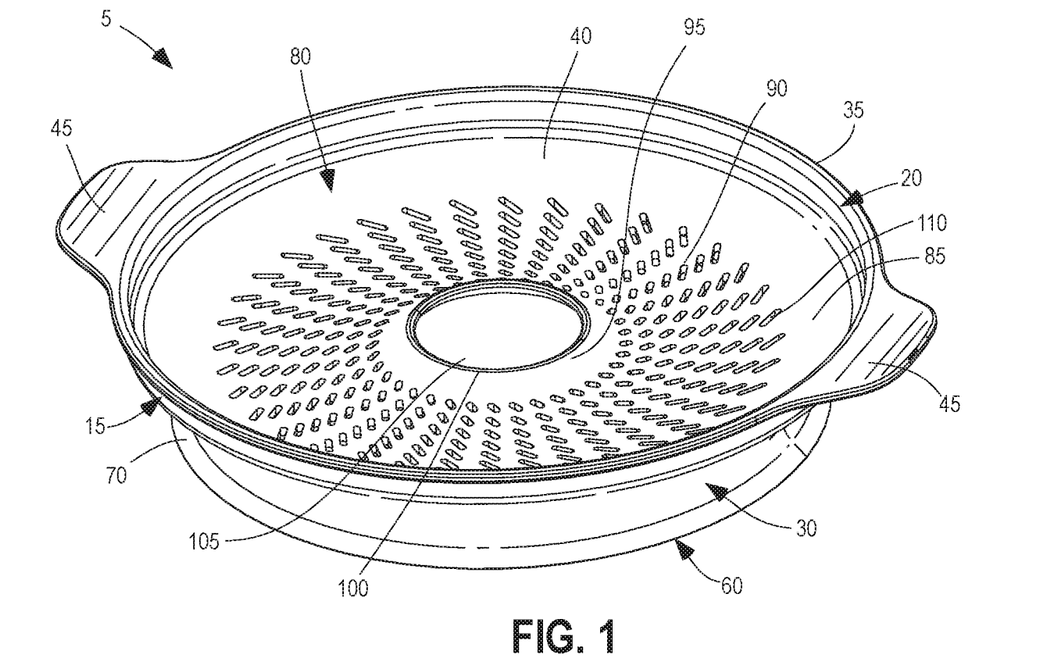
FIG. 1 depicts a top perspective view of a vessel insert of the present invention.
Figure 2:
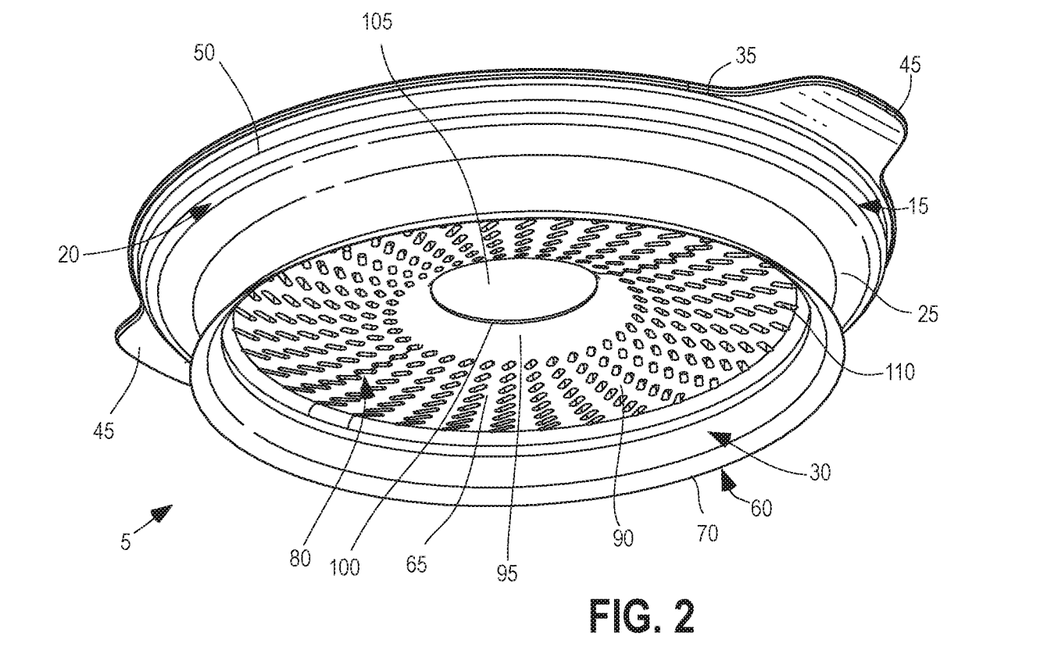
FIG. 2 depicts a bottom perspective view of the vessel insert of FIG. 1.
Figure 3:
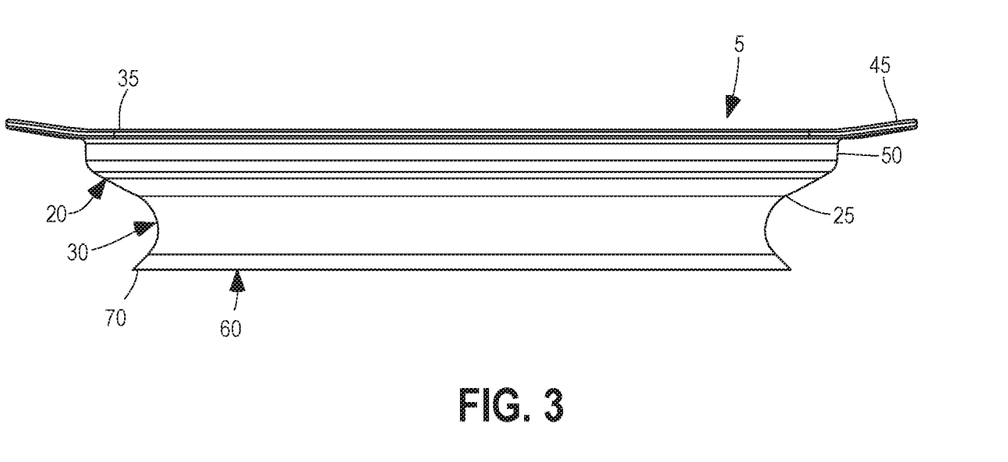
FIG. 3 depicts a side view of the vessel insert of FIGS. 1 and 2.

The present disclosure is directed to a no-boil over lid, vessel insert 5, for use in a cooking vessel (known hereinafter as cooking vessel 10). Referring to FIGS. 1-3, the vessel insert 5 can include a body portion 15, which includes an upper body portion 20, a transition wall 25, and a skirt 30. The upper body portion 20 is preferably a cylindrical annular ring with a rim or upper edge 35 circumscribing the upper body portion 20. The upper edge 35 defines an upper open end 40, an opening into the upper body portion 20. In addition to circumscribing the upper body portion 20, the upper edge 35 may form a rim having a pair of handles 45. The handles 45 may be formed as a ledge, quadrilateral, half circle, or any other shape that projects away from the upper edge 35 that a user may grasp and use to lift the vessel insert 5. The handles 45 are preferably located and positioned on opposite sides of the upper body portion 20.

Figure 4:
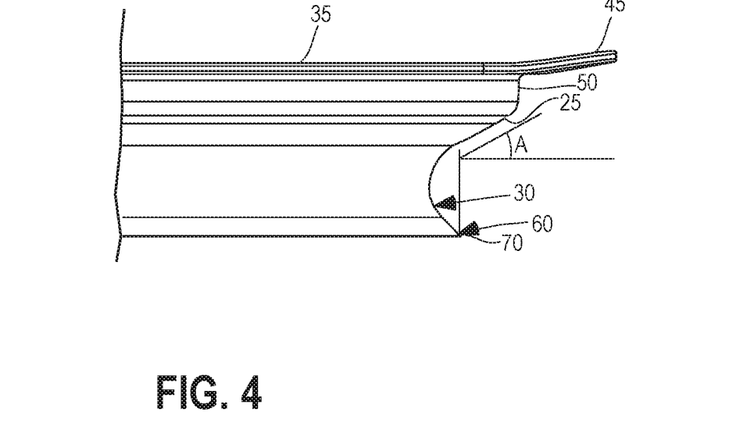
FIG. 4 depicts a partial cross-sectional side view of the vessel insert of FIGS. 1-3.

The upper body portion 20 further includes an upper wall 50, which extends downwards in a substantially vertical manner, away from the upper edge 35. The upper wall 50 is adjacent to and abuts the transition wall 25, where the transition wall 25 continues to extend away from the upper edge 35 and towards a center of the vessel insert 5. As illustrated in FIG. 4, the circumference of the transition wall 25 decreases as the transition wall 25 extends downwards at a transitional angle A. The transitional angle A of the transition wall 25 is such that when the vessel insert 5 is positioned in a cooking vessel, the transition wall 25 engages an upper rim (known hereinafter as upper rim 55) of the cooking vessel 10 to support the vessel insert 5 therein. For example, the transitional angle A can be about 0°-60°. And in an embodiment, the transitional angle A can be about 30°.

Turning back to FIGS. 1-3, the transition wall 25 is also adjacent to and abuts a skirt 30, or lower body portion, of the vessel insert 5. The skirt 30 preferably gradually extends outwards, increasing in circumference, as the skirt 30 projects away from the transition wall 25. The skirt 30 is shaped and sized so that the vessel insert 5 may be supported by and within the cooking vessel 10. The skirt 30 includes a lower edge 60, a bottom rim that defines an open bottom end 65 of the vessel insert 5. The lower edge 60 may also include a seal 70, which circumscribes the lower edge 60, and is thick enough so that the seal 70 may engage with an inner surface (known hereinafter as inner surface 75) of the cooking vessel 10 when the vessel insert 5 is positioned therein. The seal 70 can prevent liquid/boil over from occurring between the skirt 30 and the inner surface 75 of the cooking vessel.

Figure 5:
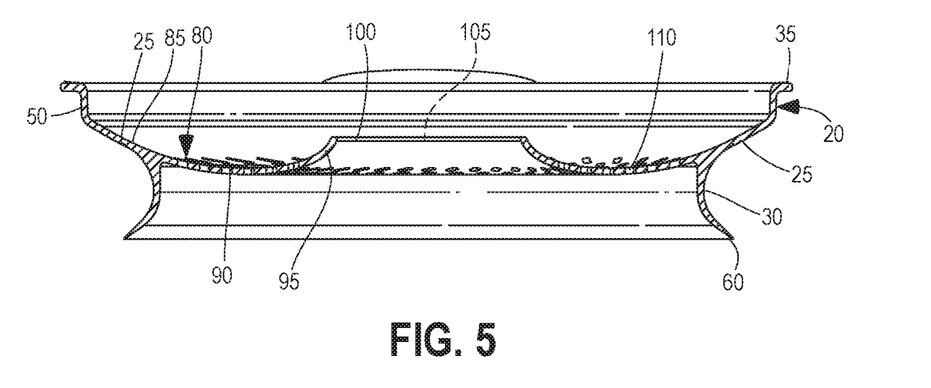
FIG. 5 depicts a cross-sectional side view of the vessel insert of FIGS. 1-4.

As shown in FIGS. 1, 2, and 5, the vessel insert 5 includes a basket 80 located and positioned inside the vessel insert 5. The basket 80 is preferably a concave member, where the sidewall 85 of the basket 80 tapers radially inwards as the sidewall 85 extends radially downwards along the transition wall 25. The sidewall 85 continues to extend radially downwards, away from the upper edge 35, until the sidewall 85 becomes a bottom surface 90. The bottom surface 90, a substantially horizontal surface, then transitions into a lower surface 95 which extends radially upwards from the bottom surface 90, towards the upper edge 35. The lower surface 95 ends at a rim or lower surface edge 100 of a center hole 105, an aperture located and positioned in the center of the basket 80. The basket 80 further includes a plurality of small holes 110 located and positioned in the bottom surface 90 of the basket 80.

In other words, the basket 80 includes the sidewall 85, the bottom surface 90, and the lower surface 95. The lower surface edge 100, located and positioned at a first height, circumscribes the center hole 105. The bottom surface 90 of the basket 80 is located and positioned at a second height which is lower than the first height, while the sidewall 85 extends upwards from the bottom surface 90 to a third height. The third height is greater than both the first height and the second height, such that the sidewall 85 extends downwards towards the bottom surface 90 and the bottom surface 90 extends upwards towards the lower surface 95.

Figure 6:
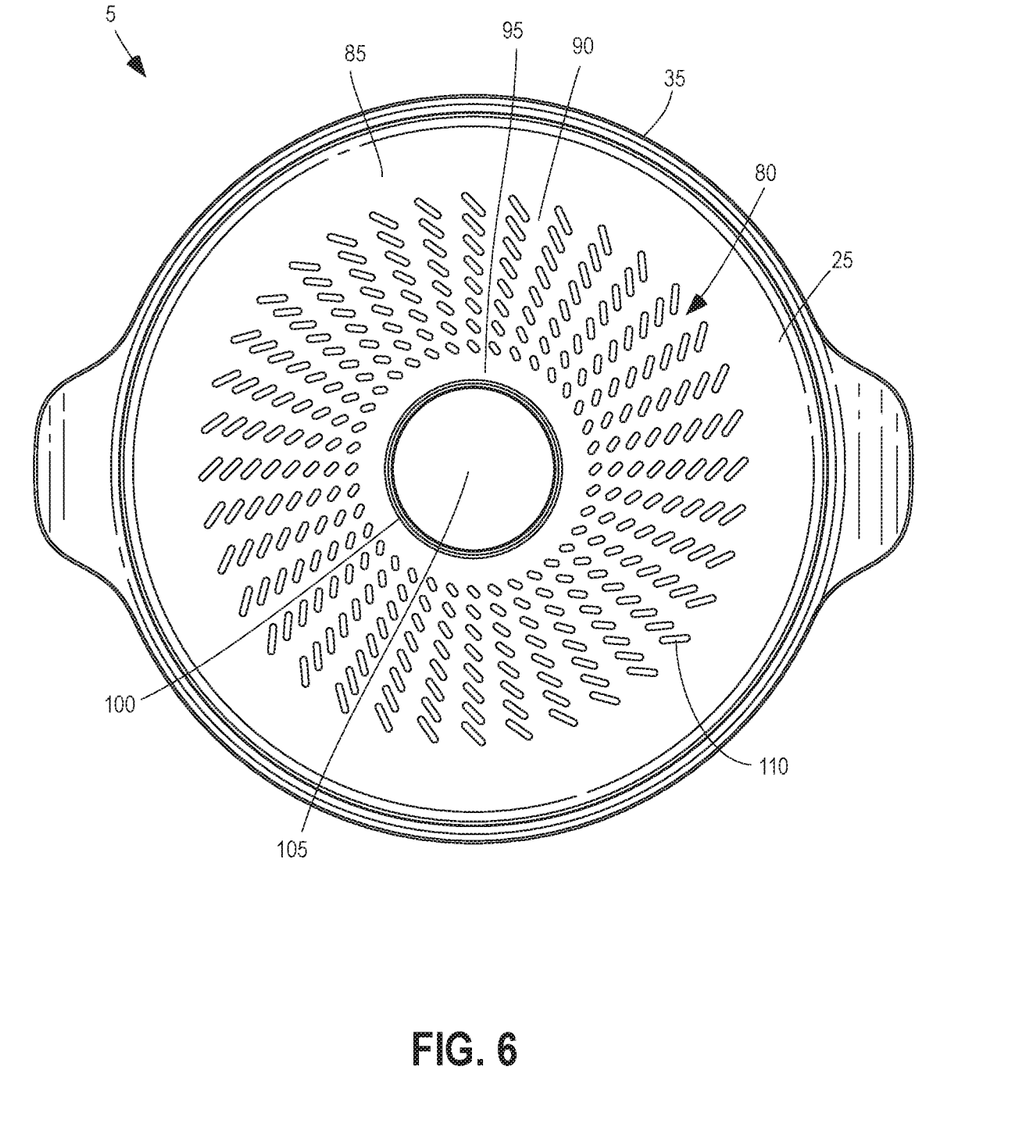
FIG. 6 depicts a top plan view of the vessel insert of FIGS. 1-5.
Figure 7:
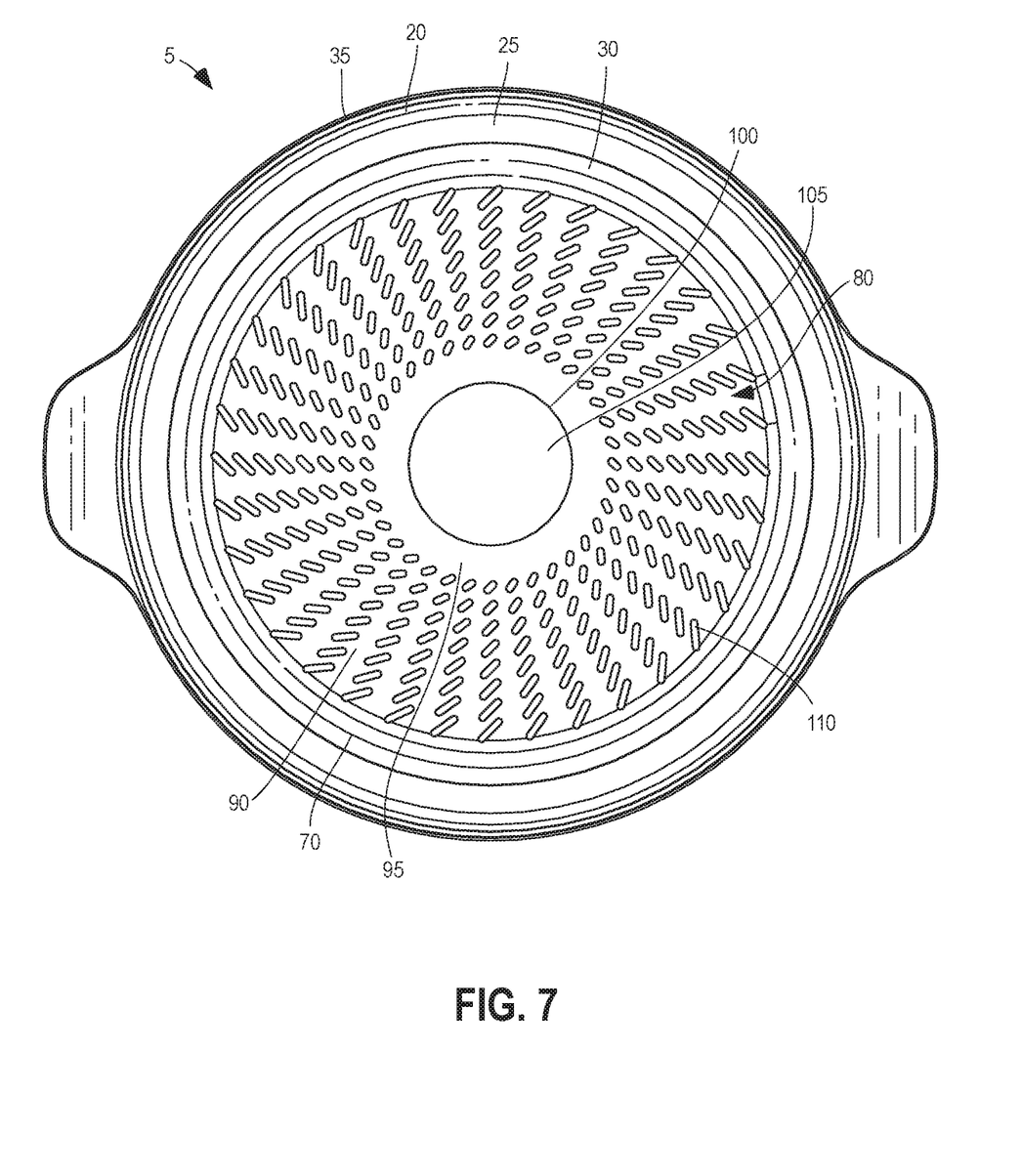
FIG. 7 depicts a bottom plan view of the vessel insert of FIGS. 1-6.

The structure of the basket 80 allows any foam or liquid produced when a cooking vessel 10 boils over to be directed back into the cooking vessel 10 though the small holes 110. The center hole 105 of the basket is preferably substantially larger than the plurality of small holes 110, and is shaped and sized to allow the liquid within the cooking vessel 10 access to atmosphere. Allowing boiling liquids access to the atmosphere can reduce the amount of boil over and/or foam that results from the boiling liquid. The center hole 105 is further shaped and sized the boil over liquid and/or foam may be directed out over the top of edge 100 of center hole 105, and also maximizes the number of small holes 110. In one embodiment, the plurality of small holes 110 may be arranged in a hole pattern around the center hole 105, illustrated in FIGS. 6 and 7.

Figure 8:
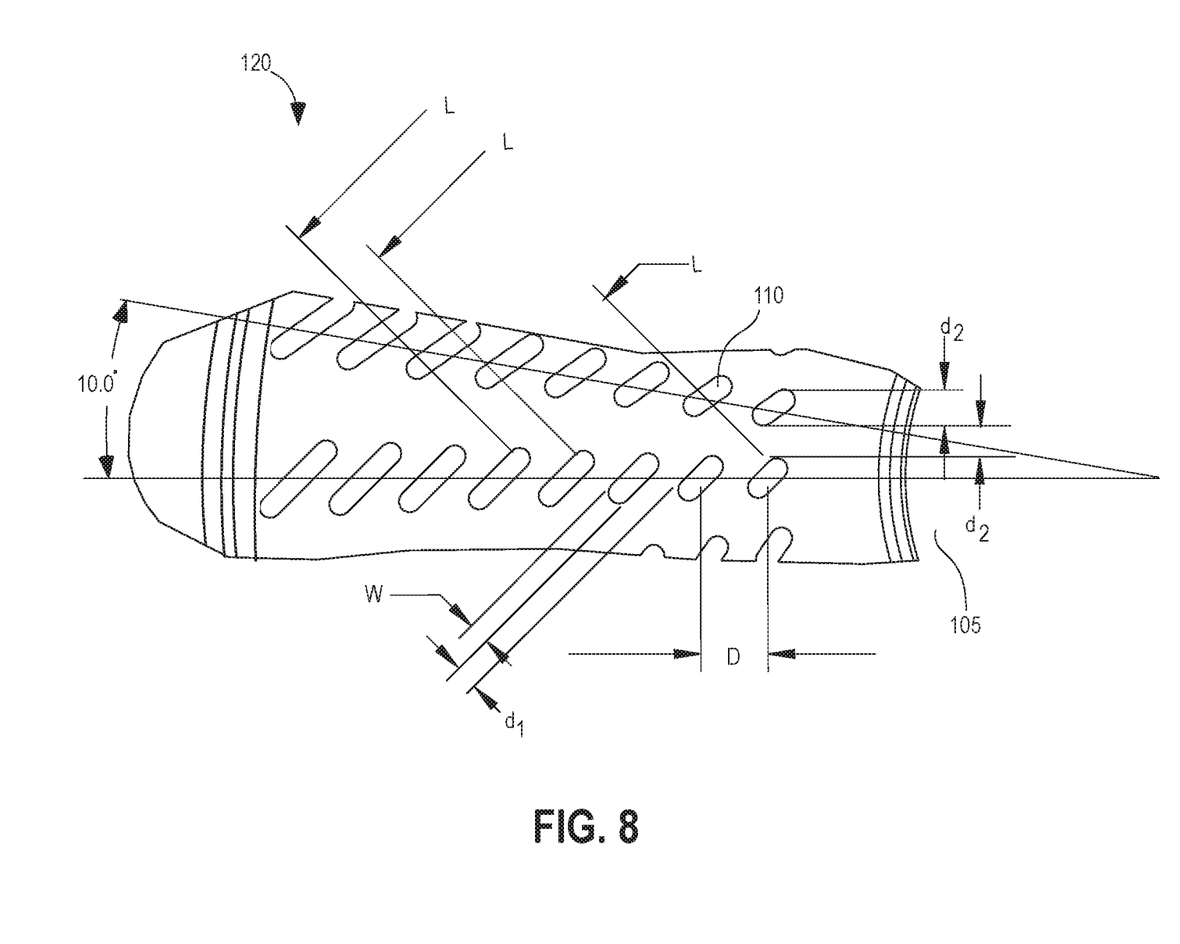
FIG. 8 depicts a partial section view of a basket.

Referring to FIG. 8, each of the plurality of small hole 110 can be pill-like shape or an elongated oval, having length L and width W. The length L and Width W of small holes 110 can be constant through the hole pattern 120. Alternatively, the length L and Width W of small holes 110 can increase in sizes as the small holes 110 move outwardly away from the center hole 105, as depicted in FIG. 8. The small hole 110 are also each spaced a distance D from each other. Distance $d_1$ illustrates an alternative measurement between small holes 110 measured along the same axis as Width W. Rows of small holes 110 may be separated by Distance $d_2$, which may increase in size as the small holes 110 move outwardly away from the center hole 105, as depicted in FIG. 8. The distance D or $d_1$ between the small holes 110 may be constant throughout the hole pattern 120. For example, the distance D between adjacent small holes 110 may be about 5 mm. Alternatively, as seen in the illustrated embodiment of FIG. 8, the distance D between adjacent small holes 110 increases as the holes 38 move outwardly away from the center hole 105, and may range from 3 mm to 8 mm. In yet another embodiment, the length L and Width W of small holes 110 may be any size and shape, as well as any distance D from one another, as long as the small holes 110 allow the foam or liquid produced when the cooking vessel 10 boils over to be directed back into the cooking vessel 10.

Figure 9:
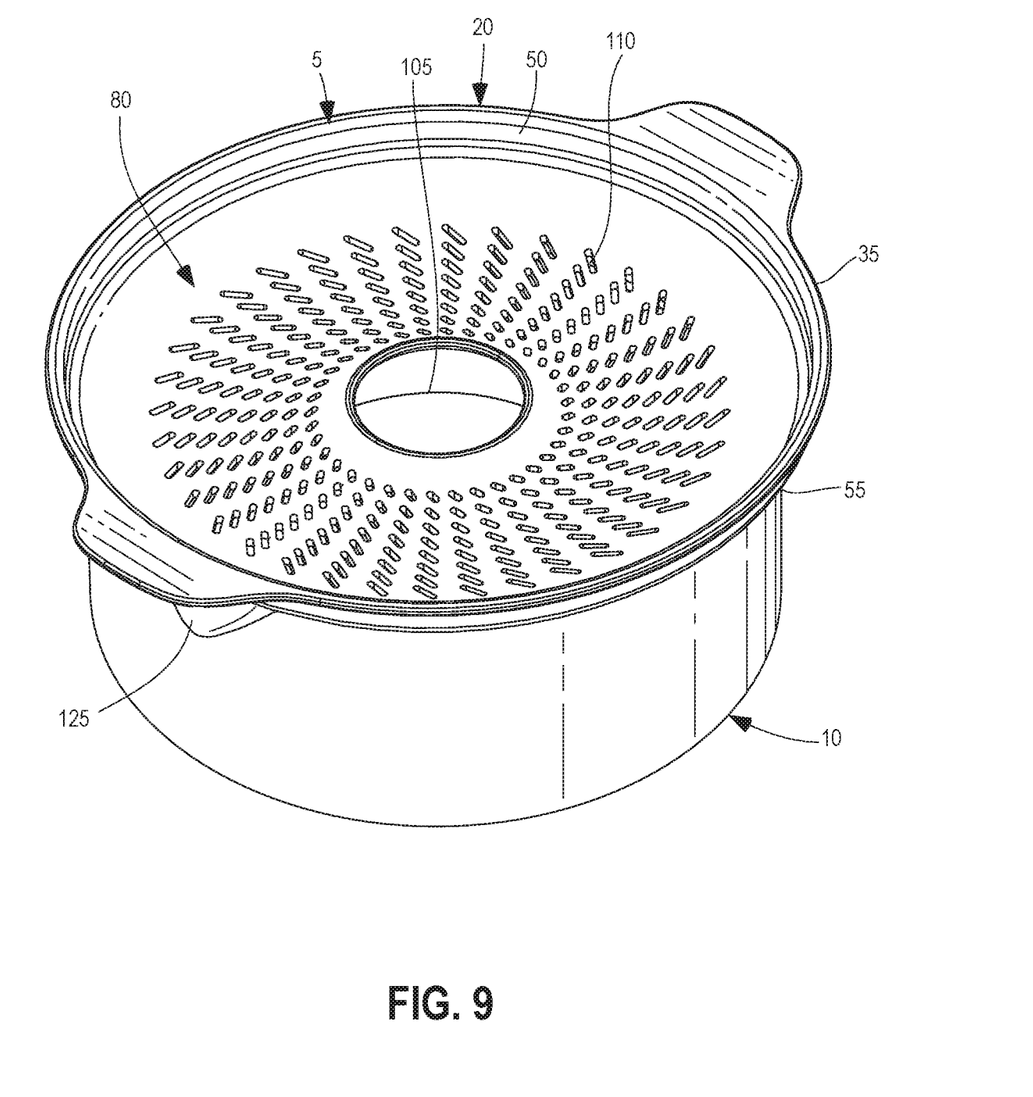
FIG. 9 depicts a top perspective view of the vessel insert of FIGS. 1-7 positioned in a cooking vessel.
Figure 10:
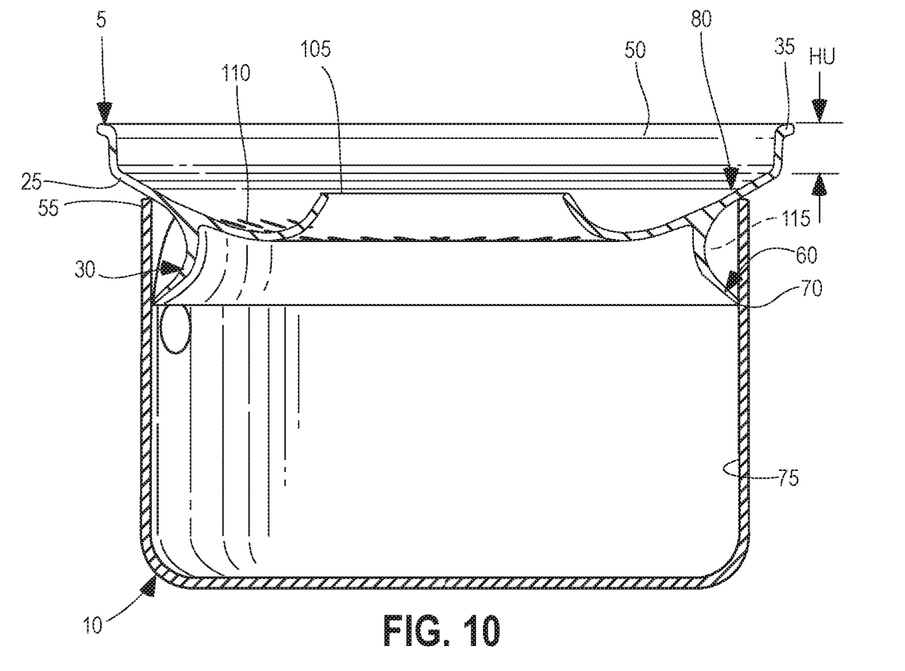
FIG. 10 depicts a first cross-sectional side view of the vessel insert of FIGS. 1-7 and 9 positioned in the cooking vessel of FIG. 9.
Figure 11:
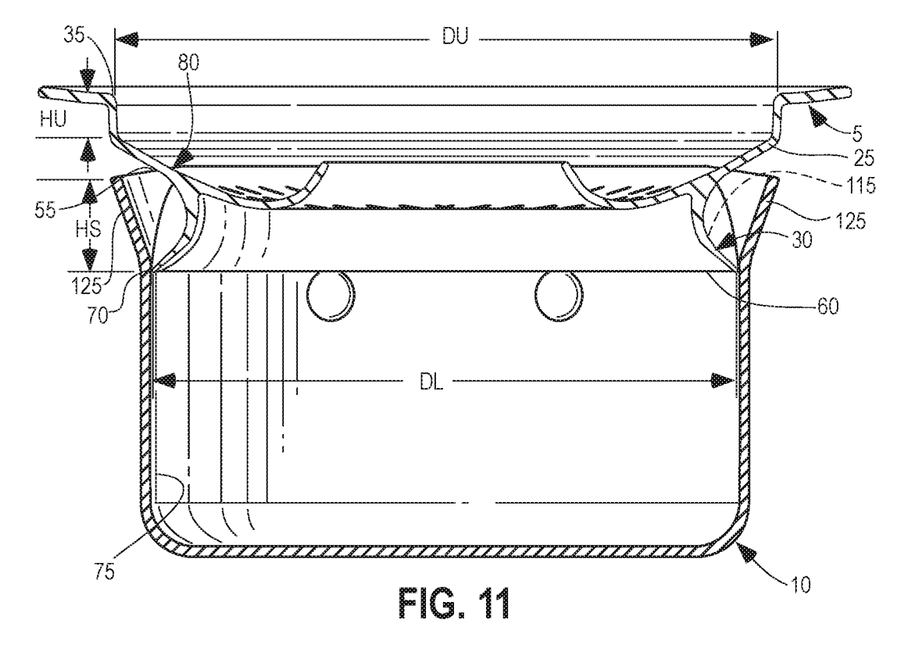
FIG. 11 depicts a second cross-sectional side view of the vessel insert of FIGS. 1-7 and 9-10 positioned in the cooking vessel of FIGS. 9 and 10.

Turning to FIGS. 9-11, the vessel insert 5 is positioned within the cooking vessel 10. When using the vessel insert 5, the vessel insert 5 may be placed within the open end 115 of the cooking vessel 10, so that the transition wall 25 of the vessel insert 5 rest on the upper rim 55 of the cooking vessel 10. Thus, the diameter DU of upper edge 35 of the upper body portion 20 preferably has an equal or greater diameter than the diameter of the cooking vessel 10. In the manner, the transition wall 25 of the vessel insert 5 rests on an upper rim 55 of the cooking vessel 10. In one embodiment, the diameter DU of the upper edge 35 of the upper body portion 20 can be greater than the diameter of the cooking vessel 10. The upper edge 35 of the vessel insert 5 therefore extends past the cooking vessel 10, providing additional area to contain the boil-over. Additionally, the hole pattern 120 of the small holes 110 is preferably maintained within the diameter of the cooking vessel 10, such that the boil-over drains back into the cooking vessel 10. Furthermore, the height HU of the upper wall 50 of the upper body portion 20 is preferably great or high enough that the liquid/boil over exiting the cooking vessel 10 through the center hole 105 will remain within the basket 80, and therefore also in the cooking vessel 10. The liquid/boil over therefore does not overflow past and over the upper edge 35 of the cooking vessel 10.

The vessel insert 5 is preferably used with and matched with a cooking vessel 10 that has a slightly larger diameter than the diameter DL of the lower edge 60 or seal 70 of the skirt 30. Thus, the diameter DL of the lower edge 60 of the skirt 30 is preferably sized such that the seal 70 engages an inner surface 75 of the cooking vessel 10 (shown in FIG. 11). The engagement of the seal 70 and the inner surface 75 preferably prevents liquid or boil over from exiting the cooking vessel 10 in between the skirt 30 and the inner surface 75. The skirt 30 preferably extends far enough into the cooking vessel 10 so that when the seal 70 is selectively engaged with the inner surface 75 of the cooking vessel, the height HS of the skirt 30 provides at least one of the following functions: (1) stabilizes the vessel insert 5 on the cooking vessel 10; and/or (2) positions the lower edge 60 of the skirt 30 below a spout 125 of the cooking vessel 10.

The vessel insert 5 can be made of a uniform construction, single material, or combinations of materials. The vessel insert 50 can be molded from plastic, silicon, or the like. The vessel insert 50 can be made of a single material or multiple materials. For example, the body portion 15 may be molded from plastic, silicon, or the like, and the basket 80 can be made of a combination of metal and plastic/silicone.

In the above description, the vessel insert 5 is shown and described as being circular in shape. However, it is envisioned that the vessel insert can be any shape, mating the shapes of cooking vessels, include circular, elliptical, oblong, rectangular, square, and the like.

As is evident from the foregoing description, certain aspects of the present invention is not limited by the particular details of the examples illustrated herein, and it is therefore contemplated that other modifications, applications, variations, or equivalents thereof, will occur to those skilled in the art. Many such changes, modifications, variations and other uses and applications of the present constructions will, however, become apparent to those skilled in the art after considering the specification and the accompanying drawings. In addition, unless mention was made above to the contrary, it should be noted that all of the accompanying drawings are not to scale. All such changes, modifications, variations and other uses in applications which do not depart from the spirit and scope of the present inventions are deemed to be covered by the inventions which are limited only by the claims which follow.

The invention claimed is:

1. A vessel insert comprising:
an upper wall including an upper edge, the upper edge circumscribing the upper wall;
a transition wall extending radially downward from the upper wall;
a basket including a sidewall, a bottom surface, and a lower surface;
the sidewall extending radially and inwardly downward from and along the transition wall and towards the bottom surface, the bottom surface extending inwardly and upwardly towards the lower surface such that the lower surface is positioned above the bottom surface, the lower surface circumscribing a center hole;
a plurality of small holes located and positioned within and extending through the bottom surface.

2. The vessel insert as set forth in claim 1, wherein the upper wall extends substantially vertically downwards.

3. The vessel insert as set forth in claim 1, wherein the transition wall tapers inwards at an angle between 0°-60°.

4. The vessel insert as set forth in claim 3, wherein the transition wall tapers inwards at a 30° angle.

5. The vessel insert as set forth in claim 1, wherein the transition wall engages an upper rim of a cooking vessel to support the vessel insert in the cooking vessel.

6. The vessel insert as set forth in claim 1, wherein the upper edge forms at least one handle.

7. The vessel insert as set forth in claim 1, wherein the plurality of small holes are elongated oval shapes.

8. The vessel insert as set forth in claim 1, wherein the plurality of small holes have a distance ranging from 3 mm to 8 mm between each small hole.

9. The vessel insert as set for in claim 1, wherein the vessel insert further includes a skirt, the transition wall extending towards the skirt.

10. The vessel insert as set forth in claim 9 wherein the skirt includes a seal located and positioned at a lower edge of the skirt.

11. A vessel insert comprising:
a basket including a sidewall, a bottom surface, and a lower surface;
the lower surface having a lower surface edge circumscribing a center hole, the lower surface edge being located and positioned at a first height;
the bottom surface of the basket being located and positioned at a second height which is lower than the first height, the bottom surface including a plurality of small holes; and
the sidewall extending upwards from the bottom surface to a third height, the third height being greater than both the first height and the second height, such that the sidewall extending downwards towards the bottom surface, and the bottom surface extending upwards towards the lower surface.

12. The vessel insert as set forth in claim 11 wherein the vessel insert includes an upper body portion, the upper body portion including an upper edge circumscribing the upper body portion.

13. The vessel insert as set forth in claim 12 wherein the upper edge forms a pair of handles.

14. The vessel insert as set forth in claim 12 wherein the upper body portion extends downwards towards a transition wall.

15. The vessel insert as set forth in claim 14 wherein the transition wall extends downwards at a transition angle between 0°-60°.

16. The vessel insert as set forth in claim 15 wherein the transition angle is 30°.

17. The vessel insert as set forth in claim 11 wherein the vessel insert includes a skirt.

18. The vessel insert as set forth in claim 17 wherein the skirt includes a lower edge which circumscribes an open bottom end of the skirt.

19. The vessel insert as set forth in claim 18 wherein the vessel insert includes a seal that circumscribes the lower edge of the skirt.

20. The vessel insert as set forth in claim 11 wherein the plurality of small holes are elongated oval shapes.

* * * * *